(12) United States Patent
Johnston

(10) Patent No.: US 8,520,836 B2
(45) Date of Patent: *Aug. 27, 2013

(54) PROJECTION HEADSET

(75) Inventor: Timothy P. Johnston, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 643 days.

This patent is subject to a terminal disclaimer.

(21) Appl. No.: 11/492,508

(22) Filed: Jul. 24, 2006

(65) Prior Publication Data

US 2008/0044005 A1    Feb. 21, 2008

(51) Int. Cl.
*H04M 1/00* (2006.01)
*H04M 9/00* (2006.01)
*H04R 25/00* (2006.01)

(52) U.S. Cl.
USPC ........ 379/430; 455/569.1; 381/388; 381/374; 381/333

(58) Field of Classification Search
USPC ............ 379/430, 428.01, 428.02; 345/7, 345/8; 353/122; 455/41.1, 41.2, 41.3, 569.1, 455/575.2; 381/370, 381, 384; 235/472.01; 340/5.92
See application file for complete search history.

(56) References Cited

U.S. PATENT DOCUMENTS

| | | | |
|---|---|---|---|
| 4,340,274 A * | 7/1982 | Spooner | 359/455 |
| 6,211,903 B1 * | 4/2001 | Bullister | 348/14.16 |
| 6,853,293 B2 * | 2/2005 | Swartz et al. | 340/5.92 |
| 6,982,683 B2 * | 1/2006 | Stanton | 345/7 |
| 7,140,546 B1 * | 11/2006 | Terlizzi et al. | 235/472.01 |
| 7,446,822 B2 * | 11/2008 | Stern et al. | 348/747 |
| 7,497,578 B2 * | 3/2009 | Wood | 353/43 |
| 2003/0001823 A1 | 1/2003 | Oya et al. | |
| 2003/0092384 A1 * | 5/2003 | Ross, III | 455/41 |
| 2006/0103590 A1 | 5/2006 | Divon | |
| 2006/0203998 A1 * | 9/2006 | Ben-Arie | 379/430 |
| 2007/0064311 A1 * | 3/2007 | Park | 359/630 |
| 2008/0212041 A1 * | 9/2008 | Koizumi et al. | 353/122 |

FOREIGN PATENT DOCUMENTS

| | | |
|---|---|---|
| EP | 0531645 A | 3/1993 |
| EP | 1223729 A | 7/2002 |
| JP | 2000152202 A | 5/2000 |

OTHER PUBLICATIONS

Symbol Technologies, Inc.. Preliminary Specifications: Laser Projection Display (LPD). Jul. 2002. U.S.A.
The International Bureau of WIPO. International Preliminary Report on Patentability: PCT/US2007/016242. Jan. 2009. Geneva, Switzerland.

* cited by examiner

*Primary Examiner* — Mohammad Islam
*Assistant Examiner* — Phylesha Dabney
(74) *Attorney, Agent, or Firm* — Chuang Intellectual Property Law

(57) ABSTRACT

An apparatus and method are provided for displaying data or an image from a headset and acquiring data with a headset. In one example, a headset includes a processor, an acoustic transducer operably coupled to the processor, and a projector/scanner operably coupled to the processor for displaying an image on a surface exterior to the headset. The projector may also be used to acquire or capture data from a surface exterior to the headset. Advantageously, data and images may be displayed and acquired with a headset without requiring the headset to be taken off.

16 Claims, 5 Drawing Sheets

PROJECTION HEADSET

TECHNICAL FIELD

The present invention relates generally to headset devices and, more particularly, to a projection headset and method of use of the headset.

BACKGROUND

As modern headsets become lighter and more comfortable to wear, a user may continue to wear the headset after a conversation and await the next conversation without removing the headset. Furthermore, it may be the desire of the headset user to know a caller's identification prior to answering a call, to know headset settings, and/or to view images, pictures, or video.

However, current means and methods do not allow for easily displaying visual data related to the headset without requiring the headset to be taken off. The display of most visual data including a caller identification function has been typically achieved using a display on the headset device. This has required the user to have the headset in a position where the display was visible in order to read the display, usually requiring the user to take off the headset from the user's head.

Thus, a headset and method for easily displaying and acquiring data without requiring the headset to be in the user's sight or requiring the doffing of the headset is highly desirable.

SUMMARY

The present invention provides an apparatus and method for displaying data from a headset and acquiring data with a headset without requiring the headset to be doffed.

In one embodiment of the present invention, a headset is provided, the headset comprising a processor, an acoustic transducer operably coupled to the processor, and a projector operably coupled to the processor for displaying an image on a surface exterior to the headset.

In accordance with another embodiment of the present invention, another headset is provided, the headset comprising a processor, an acoustic transducer operably coupled to the processor, and a scanner operably coupled to the processor for scanning an image from a surface exterior to the headset.

In accordance with yet another embodiment of the present invention, a method of displaying data from a headset is provided, the method comprising providing a headset including a processor and a projector operably coupled to the processor, providing data from a first data source to the processor, sending image data from the processor to the projector, and displaying an image on a surface exterior to the headset.

In accordance with yet another embodiment of the present invention, a method of scanning data with a headset is provided, the method comprising providing a headset including a processor and a scanner operably coupled to the processor, scanning data on a surface exterior to the headset, decoding the scanned data, sending the decoded data to the processor, and utilizing the decoded data.

Advantageously, the present invention permits a headset user to easily see headset-related data or acquire data without requiring the headset to be taken off.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present invention provides an apparatus and method for displaying data from a headset and acquiring data with the headset. In one example, the headset is able to display and/or acquire data while the headset is being worn by the user.

Figure 1:
FIG. 1 shows a headset of the present invention in use in accordance with an embodiment of the present invention.
Figure 1A:
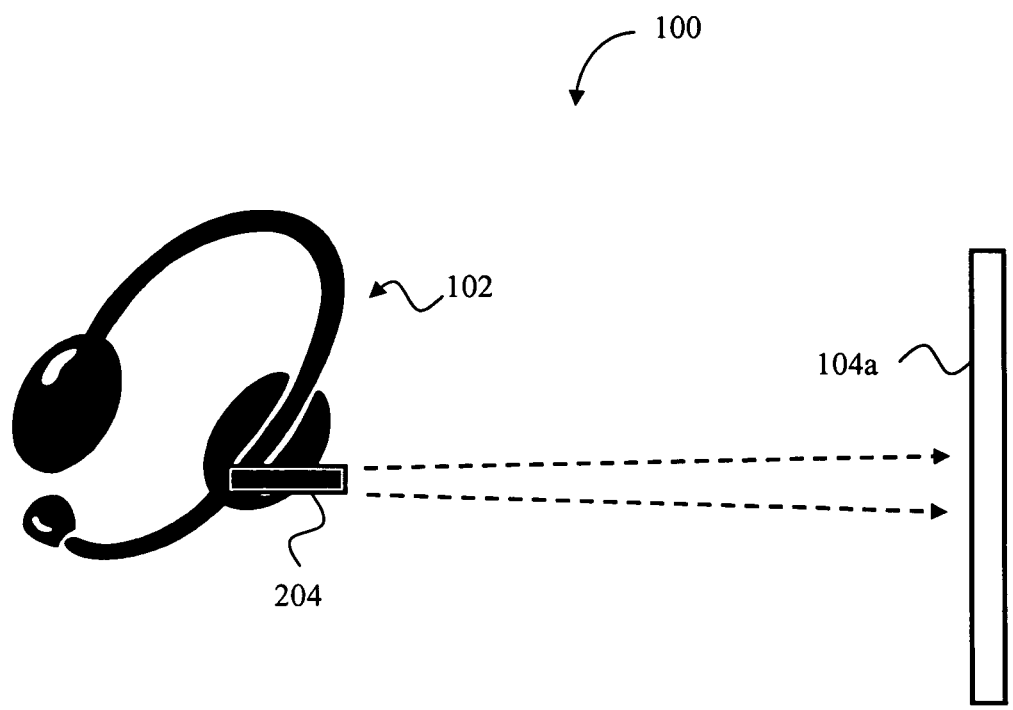
FIG. 1A shows a system including a headset for displaying data on a surface exterior to the headset in accordance with an embodiment of the present invention.
Figure 1B:
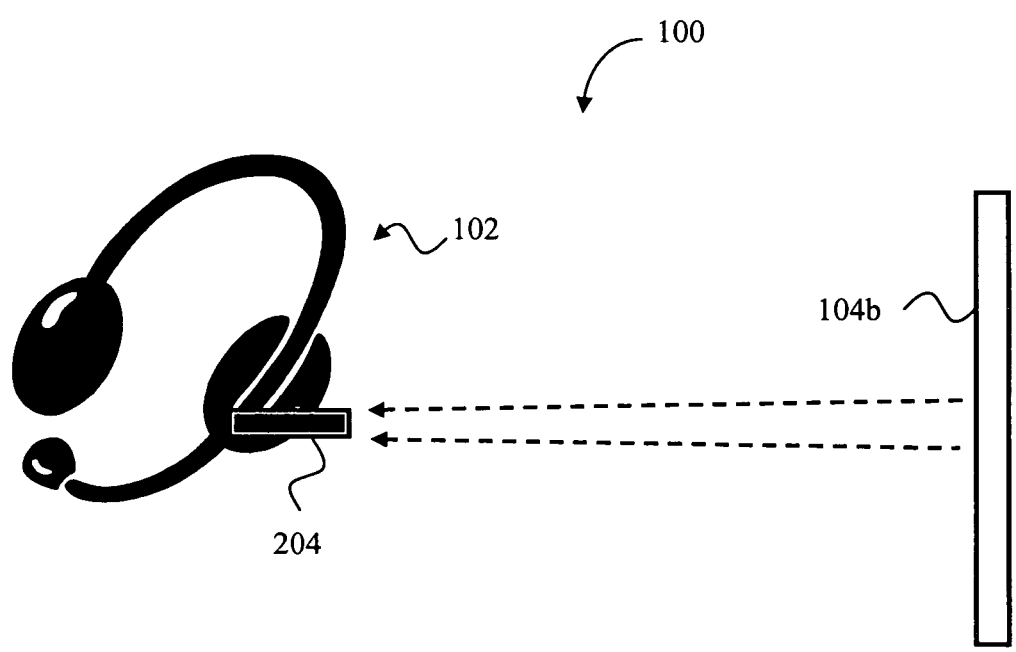
FIG. 1B shows a system including a headset for acquiring data from a surface exterior to the headset in accordance with an embodiment of the present invention.

Referring now to FIGS. 1, 1A, and 1B, a system 100 is illustrated in accordance with an embodiment of the present invention. FIG. 1 illustrates a headset 102 of the present invention in use on a surface 104. System 100 includes a headset 102 having a projector/scanner 204, a surface 104a for displaying an image from headset 102 (as shown in FIG. 1A), and a surface 104b for capturing/acquiring an image therefrom using headset 102 (as shown in FIG. 1B).

In one embodiment of the present invention, headset 102 projects an image (e.g., a telephone number, a name, an icon, etc.) via emitted light from projector/scanner 204, in one example a laser, allowing the image to be seen in front of the headset user on surface 104a. In another embodiment, projector/scanner 204, in one example a laser, acquires data from surface 104b exterior to the headset. The projected image may be of various types, including but not limited to alpha-numeric text and icons related to headset functions (e.g., headset settings, battery life, reception strength, telephone book entries), MP3 song titles, full motion video, time, date, and so on. The image display may be used for various purposes, including but not limited to identifying callers, viewing headset settings, displaying alpha-numeric text while using voice-dialing or voice data entry, or showing pictures or video. The projected image can be displayed on and data acquired from various surfaces exterior to the headset, including but not limited to the user's hand, a piece of paper, desktop, wall, and so on.

Headset 102 may be wired or wireless. In one example, headset 102 may be wired to an adaptor which is coupled to a network, or headset 102 may be wirelessly coupled to an access point (AP), which is operably coupled to a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (WiFi), and/or Voice over Internet Protocol (VoIP).

In accordance with an embodiment of the present invention, an AP includes a transceiver and a processor configured to allow a wireless device (e.g., a headset) access to a network connected to the access point (e.g., via a 10/100 Ethernet RJ-45 port). An AP may be any device that allows wireless-equipped computers and other devices to communicate with a wired network. In one example, an AP is able to support WiFi in general, and the 802.11a, 802.11b, and/or 802.11g wireless networking standards in particular. In other examples, the AP may be able to support other wireless networking standards.

Figure 2:
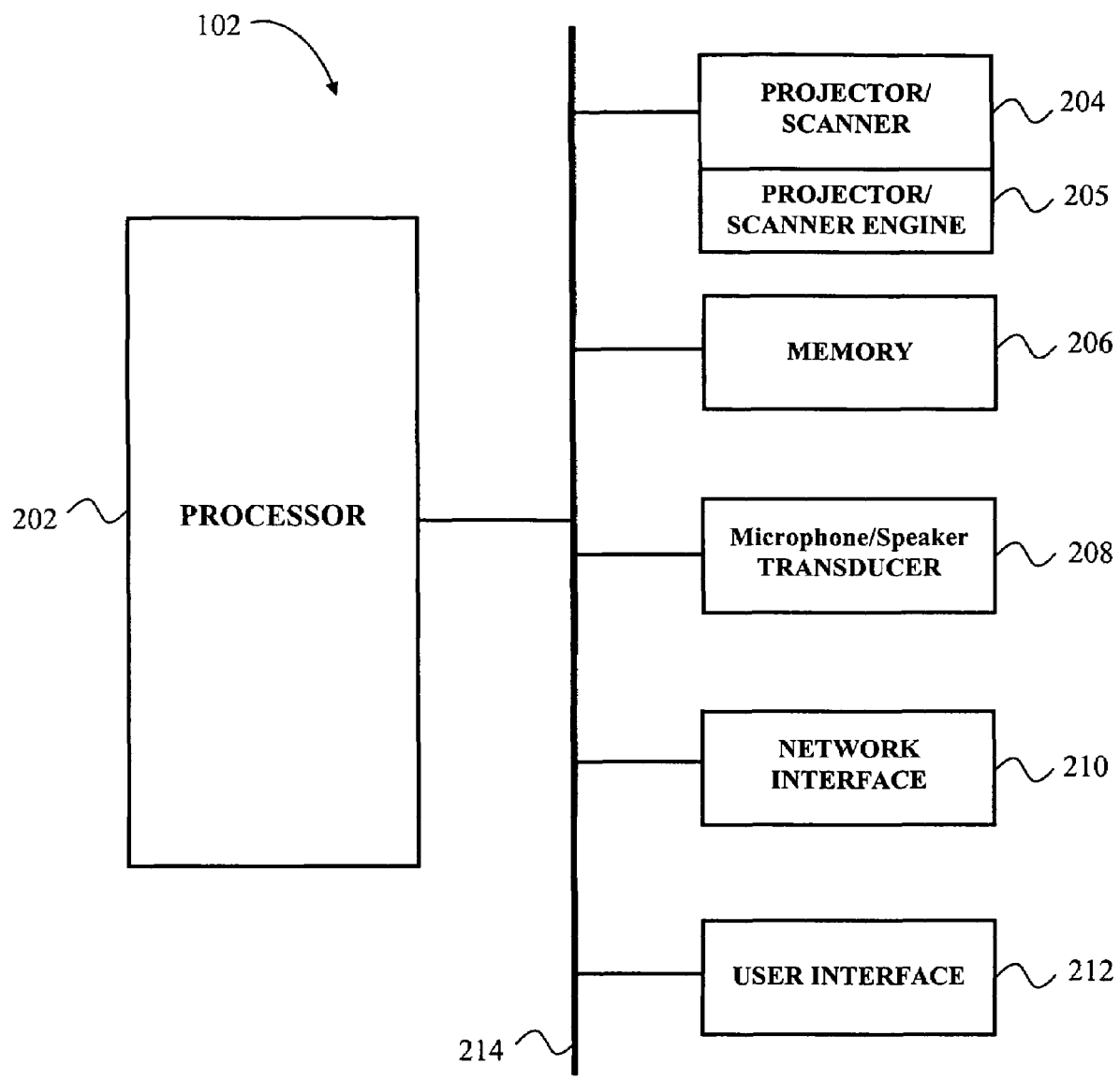
FIG. 2 shows a block diagram of a headset for displaying and acquiring data in accordance with an embodiment of the present invention.

Referring now to FIG. 2 in conjunction with FIGS. 1A and 1B, a block diagram of an example of headset 102 is shown in accordance with an embodiment of the present invention. Headset 102 includes a processor 202 operably coupled via a bus 214 to a projector/scanner 204, a projector/scanner engine 205, a memory 206, a transducer 208, a network interface 210, and a user interface 212.

Processor 202 allows for processing data, in particular managing data between projector/scanner 204, projector/scanner engine 205, memory 206, transducer 208, network interface 210, and user interface 212, for projecting images and acquiring data via projector 204. Processor 202 may also process information about access points, service providers, and service accounts. In one example, processor 202 is a high performance, highly integrated, and highly flexible system-on-chip (SOC), including signal processing functionality such as echo cancellation/reduction and gain control in another example. Processor 202 may include a variety of processors (e.g., digital signal processors), conventional CPUs being applicable.

Projector/scanner 204 and projector/scanner engine 205 include a laser operably coupled to a display engine (e.g., software, hardware, and/or firmware) in one example. An applicable laser may be miniature in size and can be coupled to a low-power display engine for creating a high-quality image on a surface, at various distances, without the need for focusing. By using laser light, a focal point is not required and the image is of high quality and legibility. Distance from the headset to the target surface, power, and brightness of the laser are parameters for use, with a large distance for a highly lit area requiring more power for the laser in typical cases. In one example, projector/scanner engine 205 can be integrated with processor 202 or projector/scanner 204, stored in memory 206, or can be an individual component of headset 102.

In another embodiment, projector/scanner 204 may also be used to capture images for future recall and/or display, identification, transmission, data input (e.g., barcode, written telephone number, business cards, etc.), or other utilization. Projector/scanner engine 205 may include text and/or barcode recognition software or firmware in one example.

One example of an applicable laser, with no intention to limit the invention thereby, is available from Symbol Technologies of Holtsville, N.Y. A laser may have a resolution of VGA 640×480, 16 levels of gray scale, a sharp image (within focus) at 5 inches to infinity in a package occupying less than about 0.2 square inches. The laser is relatively light-weight, requires relatively low power (e.g., on the order of 50 mW), and has image capture and bar-code capture functionality.

In another embodiment of the projection headset, available LCD driving techniques with a projecting light source may be used to project images. In this embodiment, projector 204 may include a light source (e.g., a laser) projected from behind an LCD display, thereby shining through the display when the LCD allows light to pass. When the LCD is driven to show text or an image, the projected light is partially blocked, thereby projecting a negative image of that on the LCD onto display surface 204.

Memory 206 may include a variety of memories, and in one example includes SDRM, ROM, flash memory, or a combination thereof. Memory 206 may further include separate memory structures or a single integrated memory structure. In one example, memory 206 may be used to store passwords, network and telecommunications programs, and/or an operating system (OS). In one embodiment, memory 206 may store projector engine 205, acquired images or data, and laser parameters.

Transducer 208 may include an acoustic transducer, such as a microphone, a speaker, or a combination thereof, for transmission of sound (such as from the user's mouth or to the user's ear based upon signals from an audio source). Transducer 208 may also include a plurality of separate transducers for performing different functions. The transducer can be any type of electromagnetic, piezoelectric, or electrostatic type of driving element, or a combination thereof, or another form of driving element, for generating sound waves from the output face of the transducer. In one embodiment, the transducer may receive signals through wireless communication channels, such as by Bluetooth™ protocols and hardware, in one example.

Network interface 210 allows for communications with APs, and in one example includes a transceiver for communicating with a wireless local area network (LAN) radio transceiver (e.g., wireless fidelity (WiFi), Bluetooth, ultra wide-band (UWB) radio, etc.) for access to a network (e.g., a wireless LAN or the Internet), or an adaptor for providing wired communications to a network. In one example, network interface 210 is adapted to derive a network address for the headset using the headset's electronic serial number, which is used to identify the headset on the network. In one embodiment, the electronic serial number may be the headset's Media Access Control (MAC) address; however, the electronic serial number may be any number that is mappable to a network address. Network interface 210 is adapted to communicate over the network using the network address that it derives for the headset. In one embodiment, network interface 210 is able to transmit and receive digital and/or analog signals, and in one example communicates over the network using IP, wherein the network interface uses the headset's MAC address or another globally unique address as its IP address. In particular, network interface 210 may be operably coupled to a network via the IEEE 802.11 protocol. However, the network interface 210 may communicate using any of various protocols known in the art for wireless or wired connectivity.

An example of an applicable network interface and the Internet protocol layers (and other protocols) of interest for the present invention are described in pending U.S. patent application Ser. No. 10/091,905 filed Mar. 4, 2002, the full disclosure of which is hereby incorporated by reference for all purposes.

User interface 212 allows for manual communication between the headset user and the headset, and in one example includes an audio and/or visual interface such that a prompt may be provided to the user's ear and/or an LED may be lit.

Figure 3:
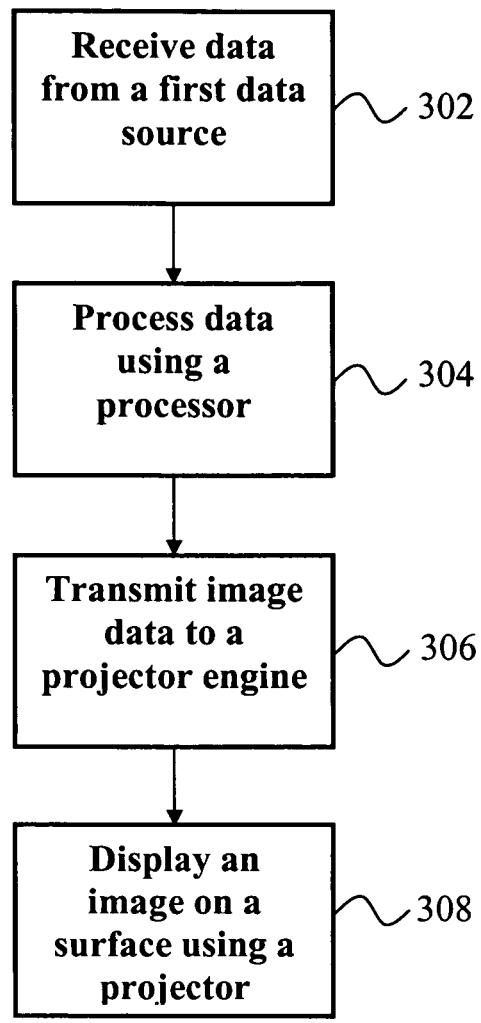
FIG. 3 shows a flowchart of a method of displaying data from a headset in accordance with an embodiment of the present invention.

Referring now to FIG. 3 in conjunction with FIGS. 1 and 2, a flowchart of a method for displaying data from headset 102 is illustrated in accordance with an embodiment of the present invention. At step 302, data is received from a first data source (e.g., a network, an RFID reader, and so on). The data and data source may be of various kinds, in one example including but not limited to caller identification data, scanned data (e.g., text or a barcode), headset settings, telephone numbers, date and time data, temperature, battery life, expected talk time, expected charge time, signal strength, text messages, visual ringer, an indicator point (e.g., as a laser pointer for presentations), a frame to be used to align an object to be scanned (e.g., a box to allow the user to align a business card for scanning or for taking a picture), and image data from a processor, a memory, a transducer, a network interface, a network, or a user interface, and so on. At step 304, the data is transmitted to processor 202 along bus 214 for processing. The data may be used to trigger, look-up, and/or produce an image to be displayed or the data itself may be processed for display. At step 306, image data related to the data from the first data source is then transmitted to projector engine 205 from processor 202 for producing and/or rendering an image that can be displayed by projector 204. At step 308, an image is displayed by headset 102 on a surface exterior to the headset.

Figure 4:
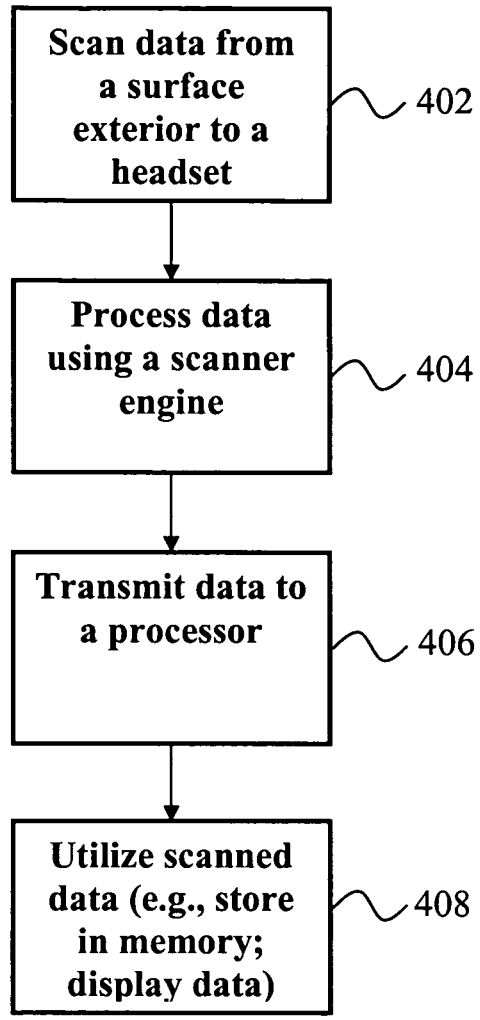
FIG. 4 shows a flowchart of a method of acquiring data with a headset in accordance with an embodiment of the present invention.

Referring now to FIG. 4 in conjunction with FIGS. 1 and 2, a flowchart of a method of acquiring data with headset 102 is illustrated in accordance with an embodiment of the present invention. At step 402, data on a surface exterior to the headset is scanned by scanner 204 (e.g., data on a business card, a bar code, and so on). At step 404, scanned data is transmitted to scanner engine 205 for decoding and the decoded data is sent to processor 202 along bus 214 for processing, as shown at step 406. The scanned data may then be used for various purposes, including but not limited to identification such as for a product, data entry such as for a telephone/address book, storage for later recall and/or transmission over a network, and so on, as shown at step 408. In another embodiment, the present invention may also allow for determination of relative movement of the headset by comparing scanned data to predetermined patterns, thereby allowing the user to input data such as a yes or no with a nod or shake, respectively, of the headset. In a further example, the headset of the present invention may also be used to control a cursor on a computer screen or a pointer.

Advantageously, the present invention provides a headset for easily displaying data or images to a headset wearer or acquiring data without requiring the headset to be taken off.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A headset, comprising:
a processor;
at least one acoustic transducer operably coupled to the processor; and
a projection laser operably coupled to the processor and mounted on the headset; the projection laser configured to transmit an image without a focal point onto a surface exterior to the headset and configured to scan data from a surface exterior to the headset.

2. The headset of claim 1, wherein the transducer includes at least one member selected from the group consisting of a speaker and a microphone.

3. The headset of claim 1, wherein the projection laser further includes a liquid crystal display (LCD).

4. The headset of claim 1, wherein the image is selected from the group consisting of alpha-numeric text, icons, and pictures.

5. The headset of claim 1, wherein the image is selected from the group consisting of a caller identification, a telephone number, a time, a date, a headset setting, an MP3 title, and movie data.

6. The headset of claim 1, wherein the projection laser includes a projector engine for encoding and decoding data for displaying images on a surface exterior to the headset and scanning images from a surface exterior to the headset, respectively.

7. The headset of claim 1, further comprising a network interface for wirelessly communicating with a network.

8. The headset of claim 7, wherein the network interface includes a transceiver.

9. The headset of claim 7, wherein the network interface supports the 802.11 a, 802.11b, and/or 802.11g wireless networking standards.

10. The headset of claim 7, wherein the network interface supports one of WiFi, BLUETOOTH®, digital enhanced cordless telecommunications (DECT), and ultra wideband (UWB).

11. A headset, comprising:
a processor for processing data from a first data source;
at least one acoustic transducer operably coupled to the processor for receiving and sending voice data; and
a projection display laser operably coupled to the processor and mounted on the headset, the laser configured to transmit an image without a focal point onto a first surface exterior to the headset and to scan an image from a second surface exterior to the headset.

12. The headset of claim 11, wherein the transducer includes at least one member selected from the group consisting of a speaker and a microphone.

13. The headset of claim 11, wherein the data from the first data source is selected from the group consisting of a caller identification, a telephone number, a time, a date, headset settings, and telephone menu items.

14. The headset of claim 11, wherein the projection display laser includes a projection display engine for encoding and decoding data for displaying images on a surface exterior to the headset and scanning images from a surface exterior to the headset, respectively.

15. The headset of claim 11, further comprising a network interface for wirelessly communicating with a network.

16. A method of displaying data from a headset, the method comprising:
providing a headset including a processor and a projection laser operably coupled to the processor and mounted on the headset;
providing data from a first data source to the processor;
sending image data from the processor to the projection laser;
transmitting an image without a focal point from the projection laser onto a surface exterior to the headset; and
scanning data from a second data source exterior to the headset and sending the data from the second data source to the processor.

\* \* \* \* \*